(12) United States Patent
Wheelock et al.

(10) Patent No.: US 7,176,159 B1
(45) Date of Patent: Feb. 13, 2007

(54) CATALYST AND SORBENT MATERIAL FOR THE PRODUCTION OF HYDROGEN

(75) Inventors: Thomas D. Wheelock, Ames, IA (US); Brent H. Shanks, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 544 days.

(21) Appl. No.: 10/218,803

(22) Filed: Aug. 14, 2002

Related U.S. Application Data

(60) Provisional application No. 60/312,529, filed on Aug. 15, 2001.

(51) Int. Cl.
*B01J 23/00* (2006.01)
*B01J 20/00* (2006.01)
*B01J 21/00* (2006.01)

(52) U.S. Cl. ............ 502/303; 502/306; 502/307; 502/311; 502/312; 502/313; 502/314; 502/315; 502/316; 502/320; 502/322; 502/327; 502/328; 502/329; 502/332; 502/333; 502/334; 502/335; 502/336; 502/337; 502/338; 502/339; 502/340; 502/341; 502/342; 502/343; 502/354; 502/355; 502/415; 502/439; 502/527.12; 502/73; 502/74; 502/84

(58) Field of Classification Search .......... 502/73, 502/74, 84, 303, 306–307, 311–316, 320, 502/322, 327–329, 332–339, 340–343, 354–355, 502/415, 439, 527.12
See application file for complete search history.

(56) References Cited

U.S. PATENT DOCUMENTS

| | | | |
|---|---|---|---|
| 4,316,813 A | | 2/1982 | Voss |
| 4,548,912 A | * | 10/1985 | Hettinger et al. ............ 502/68 |
| 4,701,436 A | * | 10/1987 | Wang et al. .................. 502/339 |
| 5,077,253 A | * | 12/1991 | Chu et al. ..................... 502/61 |
| 5,082,814 A | * | 1/1992 | Stockwell et al. ............ 502/68 |
| 5,179,054 A | | 1/1993 | Schipper |
| 5,221,656 A | * | 6/1993 | Clark et al. .................. 502/315 |
| 5,228,980 A | * | 7/1993 | Stockwell et al. ..... 208/120.15 |
| 5,286,370 A | * | 2/1994 | Chu et al. .............. 208/120.25 |
| 5,433,939 A | | 7/1995 | Wheelock |
| 5,653,955 A | | 8/1997 | Wheelock |
| 5,703,003 A | | 12/1997 | Siriwardane |
| 5,774,779 A | * | 6/1998 | Tuchinskiy ..................... 419/2 |
| 5,935,889 A | * | 8/1999 | Murrell et al. .................. 502/9 |
| 6,528,683 B1 | * | 3/2003 | Heidemann et al. ........ 562/542 |
| 6,586,361 B1 | * | 7/2003 | Heidemann et al. ........ 502/353 |

OTHER PUBLICATIONS

Westmoreland, P.R. and Harrison, D.P., 1976, Evaluation of Candidate Solids for High-Temperature Desulfurization of Low-Btu Gases, *Environmental Science and Technology*, 10, pp. 659-661.

Snyder, R.B., Wilson, W.I., Johnson I. And Jonke, A.A., 1977, Synthetic $SO_2$ Sorbents for Fluidized-Bed Coal Combustors, *J. Air Pollu. Con. Ass.*, 27, pp. 975-981.

Yang, R.T. and Shen, M.S., 1979, Calcium Silicates: A New Class of Highly Regenerative Sorbents for Hot Gas Desulfurization, *AIChE J.*, 25, pp. 811-819.

Yoo, H.J. and Steinberg, M., 1983, Calcium Silicate Cement Sorbent for $H_2S$ Removal and Improved Gasification Process, Final Report, Morgantown Energy Technology Center, Morgantown, West Virginia, pp. 1-61.

Hong, Z., Huang, X-Y., Zhang, X-Y. and Wu, B-C., 1989, Development of Advanced Synthetic Sulphur Sorbent for Fluidized Coal Bed Combustion, *Proc Int. Conf. Fluid. Bed Combst.* (1989)(10th) 1, pp. 591-595.

Kamphius, B., Potma, A.W. and Spitsbergen, U., 1989, Regenerative Sorbents for High Temperature Desulfurization of Coal Combustion Gases, In *Proceedings of the 6th Annual International Pittsburgh Coal Conference*, Pittsburgh, Pennsylvania, 2, pp. 994-1003.

Christoforou, S.C., Efthimiadis E.A. and Vasalos I.A., 1995, Sulfidation-Regeneration Cycles of ZnO-and CaO-Containing Sorbents, *Environ. Sci. Tech.*, 29, pp. 372-383.

Jagtap, S.B. and Wheelock, T.D., 1996, Regeneration of Sulfided Calcium-Based Sorbents by a Cyclic Process, *Energy & Fuels*, 10, pp. 821-827.

Chun Han and D.P. Harrison, Simultaneous Shift Reaction and Carbon Dioxide Separation for the Direct Production of Hydrogen, *Chem. Eng. Sci.*, 1994, 49 (No. 24B), pp. 5875-5883.

W.E. Waldron, et al., Production of Hydrogen by Cyclic Sorption Enhanced Reaction Process, *AIChE Journal*, 2001, 47(6), 1477-1479.

Balasubramanian, B., et al. Hydrogen from methane in a single-step process. *Chem. Eng. Sci.*, 1999, 54, 3543-3552.

Ding, Y., et al. Adsorption-enhanced steam-methane reforming. *Chem. Eng. Sci.*, 2000, 55, 3929-3940.

Hufton, J. R., et al. Sorption-enhanced reaction process for hydrogen production. *AIChE J.*, 1999, 45, 248-256.

* cited by examiner

*Primary Examiner*—Cam N. Nguyen
(74) *Attorney, Agent, or Firm*—McKee, Voorhees & Sease, P.L.C.

(57) ABSTRACT

A catalyst and sorbent is disclosed which comprises pellets with an absorbent core and a protective shell with a catalyst in the shell. Such material is especially well suited for steam reforming of hydrocarbons to produce hydrogen since a reforming catalyst can be incorporated in the shell and a sorbent for the by-product carbon dioxide can be used for the core. It is also well suited for producing hydrogen from carbon monoxide by means of the water gas shift reaction. The shell can be made sufficiently strong and durable for moving bed applications as well as fixed bed applications.

10 Claims, No Drawings

CATALYST AND SORBENT MATERIAL FOR THE PRODUCTION OF HYDROGEN

PRIORITY CLAIM

This application claims priority to U.S. provisional application Ser. No. 60/312,529 filed Aug. 15, 2001.

GRANT REFERENCE CLAUSE

The present invention has been funded, in part, by DOE Grant No. DE-FG26-02NT41549. The government may have certain rights in this invention.

FIELD OF THE INVENTION

This invention relates to a pelletized material having an absorbent core encased in a strong but porous shell having catalytic properties. Such a material is preferred for industrial chemical processes which produce hydrogen and carbon dioxide. These processes include the steam reforming of hydrocarbons and processes based on the water gas shift reaction.

BACKGROUND OF THE INVENTION

Hydrogen is an important raw material in the chemical and petroleum industries. Large quantities are used in the manufacture of ammonia and methanol and in a variety of petroleum hydrotreating processes.

Making hydrogen from methane is of particular interest because in the future hydrogen will be used for the generation of electric power by employing highly efficient fuel cells. While methane is the principal component of natural gas and may be plentiful, it can also be produced by hydrogasification of coal.

Currently, the primary method for converting methane and other light hydrocarbons to produce hydrogen is based on steam reforming. The steam methane reforming (SMR) process often involves multiple steps and severe operating conditions, including high temperatures and pressures.

A proposed method for improving the efficiency of steam methane reforming (SMR) is the Sorption Enhanced Reaction Process (SERP). The SERP method uses a fixed packed bed of an admixture of an SMR catalyst and a chemisorbent to remove carbon dioxide selectively from the reaction zone. The SERP process allows for the use of lower temperatures then those utilized in conventional SMR methods, and provides a higher degree of purity of the resulting hydrogen product.

Within the last few years, the concept of combining reaction and separation steps to simplify various chemical processes, conserve energy, and/or to improve product quality and yield has become economically attractive. Reactive distillation is one method that has been recently commercialized, along with the membrane reactors. Membrane-based reaction systems may involve the use of metallic membranes which only small molecules like hydrogen can permeate, or polymeric, ceramic, and zeolitic membranes. The membranes may act as permselective barriers, or as an integral part of the catalytically active surface.

The present inventors have now discovered a unique method of producing hydrogen through the reaction of steam with methane, other light hydrocarbons, or carbon monoxide using a catalyst and sorbent combined in the same pelletized material. The method is unique compared to presently available technology in that it does not require the catalytic reforming and product separation steps to be conducted with different materials in completely separate steps.

It is therefore a primary objective of the claimed invention to provide a material that is capable of converting methane, other light hydrocarbons, or carbon monoxide to hydrogen and at the same time separate the hydrogen from carbon dioxide co-product.

It is a further objective of the present invention to provide a one-step method of producing hydrogen through the conversion of methane, other light hydrocarbons, or carbon monoxide using a singular material.

It is a further objective of the present invention to provide a material that is regenerable.

It is a further objective of the present invention to provide a material that includes a catalyst to enhance and promote the conversion of methane to hydrogen.

It is yet a further objective of the present invention to provide a material that is durable and attrition resistant.

It is still a further objective of the present invention to provide a material that is economical to manufacture and use.

These and other objectives will become apparent after review of the following description and claims of the invention which follow.

SUMMARY OF THE INVENTION

The invention describes a catalyst and sorbent in pellet form wherein each pellet combines a reactive core with a porous protective shell having a catalyst embedded or coated on the surface of the pores of the shell. Such materials are useful for various hydrogen manufacturing processes, and specifically for catalytically reforming methane or other hydrocarbon gases to produce hydrogen and carbon dioxide while at the same time separating the hydrogen from the carbon dioxide.

DETAILED DESCRIPTION OF THE PREFERRED EMBODIMENT

The core-in-shell catalyst and sorbent of this invention includes a core of reactive, but comparatively physically weak, material and a strong but porous shell with catalytic properties. The shell maintains the structural integrity of the catalyst and sorbent during its use. The sorbent is also preferably able to retain its structural integrity during numerous cycles of use and regeneration.

The core is made of any material which will absorb or react with carbon dioxide ($CO_2$) in order to remove it from the $H_2$-containing product. The shell of the sorbent is a material which gives the pellet sufficient strength while allowing $CO_2$ gas to penetrate to (diffuse to) the sorbent material in the core. With a calcium oxide core, the successful protective layer (shell) can be largely refractory cement or alumina. Preferred materials for the preparation of CaO cores include powdered limestone, dolomite, and plaster of Paris.

Types I, III, and IV Portland cement, high alumina cement (HAC), and calcium aluminate refractory cement can be used as shell materials. These are hydraulic cements which require curing. An alternative shell material is comprised of a sintered powder (e.g., alumina) which upon heat treatment forms a strong, porous shell. Examples of core and shell raw materials which are appropriate for use in this invention include, but are not limited to, the following:

| Core material: | Shell material: |
| --- | --- |
| CaO (lime & swollen lime) | Bentonite clay |
| $CaCO_3$ (limestone, swollen limestone) | Attapulgite clay |
| $CaCO_3 \cdot MgCO_3$ (dolomite) | Zeolite material |
| MgO | Portland cements |
| SrO | High temperature refractory cement |
| BaO | Alumina |
| | Fly ash |
| | Calcium aluminates |
| | Magnesium oxysulfate cement |

It may also be possible to use CaO·MgO derived from dolomite as a core material for removing $CO_2$ from gas produced by gasifying coal. In this respect, it is believed the following reaction takes place:

$$CaO \cdot MgO_{(s)} + CO_{2(g)} \leftrightarrow CaCO_3 \cdot MgO_{(s)}$$

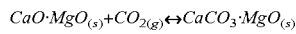

While MgO does not participate in the reaction, it serves to maintain the structural integrity and chemical reactivity of the sorbent.

The core-in-shell concept is not limited to the specifically-listed materials above. The concept can be applied to other absorbent materials which lack the necessary strength and durability in themselves to withstand repeated loading and regeneration. The effects of loading and regeneration can be particularly severe where the sorbent is converted from one chemical species to another during loading and then is converted back to the original species during regeneration. Such changes are accompanied by changes in the physical structure of the material which can produce changes in the specific volume of the material. Repeated swelling and shrinking of the material as it is loaded and regenerated can weaken the material and lead to spalling and disintegration. This type of failure has been observed with zinc-based sorbents for $H_2S$ where the material undergoes significant changes in specific volume during regeneration.

The core-in-shell concept is particularly advantageous for supporting any reactive sorbent which may lack the necessary strength to withstand extensive physical handling or repeated changes in specific volume as it is loaded or regenerated. The shell itself can be made of various refractory materials which do not react with the gases being treated. Other potential shell materials include calcium aluminate cement, aluminum oxide, and various aluminates and silicates or various types of clay which are widely used for making ceramic and refractory products. One of ordinary skill in the art would be able to ascertain additional core or shell materials appropriate to their particular application.

A small amount of a pore-forming component, such as dry potato starch, can be mixed with the shell-forming material before being applied. The starch, or other pore-forming component, will decompose when the pellets are heated to a high temperature, thereby increasing the porosity of the shell. An example of an alternative pore-forming component is granular polyethylene glycol. Any material known to one of ordinary skill in the art which will form pores (i.e. decompose at high temperature/temperature of use) without interfering with the purposes of this invention can be used.

An alternative pore-forming material is limestone itself which can be incorporated in the shell because heating the pellets to the temperature of use will decompose the limestone in the shell and provide sufficient porosity.

Although increasing shell thickness can increase pellet strength, it can also reduce the rate of diffusion through the shell and reduce sorbent capacity. One of ordinary skill in the art can optimize the composition for adsorption capacity versus crushing strength for a desired application.

Appropriate catalysts for use in the invention include any catalyst for the steam reforming of hydrocarbons. The catalyst may also be one used for the water gas shift reaction. These two types of catalysts are well known in the art and may include one or more of the following metals and/or oxides of the same: tungsten, cobalt, molybdenum, vanadium, potassium, lanthanum, iron, platinum, palladium, ruthenium, zinc, chromium, copper, or nickel. When catalytically reforming methane in the presence of a sulfide impurity (for e.g., $H_2S$), it is believed that cobalt and molybdenum are the preferred catalysts since, unlike nickel, they tend to withstand inactivation in the presence of large amounts of sulfur compounds in the feed gas. If the feed gas is relatively pure, nickel is the preferred catalyst.

While various methods can be used for incorporating a catalyst-forming material in the shell, one method is to mix such a material with the other shell-forming materials before they are applied. Another method is to impregnate core-in-shell pellets with the catalyst after the pellets have been made. For example, a reforming catalyst can be prepared by impregnating a porous shell porous shell with any of the metals listed above in salt form, followed by calcination to convert the salt into a metal oxide. The oxide can be further reduced to the metallic state.

Although the catalyst/sorbents of this invention can be produced by any method which provides the desired physical and chemical characteristics, one of the preferred methods is as follows. The pellet cores are prepared by placing a measured amount of one or more powdered core-forming materials in a revolving drum or inclined pan pelletizer. While in the pelletizer, the powder is moistened with a water spray that causes the core material to ball up into small pellets. The conditions can be controlled to produce pellets of a desired diameter. The pellets are sized by screening and those of an appropriate size are coated in the next step with the shell-forming material.

In coating the pellet cores with the protective layer, the powdered material for the protective layer, e.g., cement or alumina, is added to the pelletizing drum or inclined pan pelletizer while the pellets are being sprayed at set intervals with water. In some cases, dilute lignin solution may be included as a temporary binder in the coating process. The process can be carried out continuously by using two pelletizing drums in series separated by a vibrating screen. The core forming ingredients are supplied at a constant and controlled rate to the first pelletizing drum, and as the spherical cores are formed, they are discharged onto the vibrating screen. The material which passes through the screen is returned to the first pelletizing drum for repelletizing. The pellets that do not pass through the screen are conducted to the second pelletizing drum for coating with the shell-forming material.

The pellets are preferably comprised of cores ranging from about 3–8 mm in diameter and of shells ranging from about 0.3–1.0 mm in thickness. Pellets prepared for commercial application can be either smaller or larger. One of skill in the art would be able to choose the core and shell dimensions that will work best for the particular application of interest.

Once coated, the pellets are dried and screened to provide pellets of a uniform and appropriate size. Pellets coated with hydraulic cement are optionally cured in a steam atmosphere at 100° C. for about 1–3 days. In the case of alumina-coated pellets, neither air drying nor steam curing is required. The pellets are calcined in air at about 1100° C. for 2 hr., causing partial sintering of the shell material to produce a strong but porous structure. Calcination also alters the core material by decomposing $CaCO_3$ in the case of limestone cores or removing water of crystallization in the case of plaster of Paris cores. However, the calcium sulfate present in plaster cores is left largely intact.

In order to convert $CaSO_4$ plaster of Paris cores to CaO, the pellets are treated at 1050° to 1100° C. to several cycles of reduction and oxidation. During the reducing phase of each cycle, the pellets are treated with a reducing gas, e.g. 10% $H_2$ or 30% CO in nitrogen, for 1 to 3 minutes, and during the oxidizing phase the pellets are treated with an oxidizing gas, e.g., air, for 1 to 3 minutes.

There are several different appropriate methods that may be used to incorporate the shell material with a reforming catalyst depending on the catalytic material selected. One method is the pore volume impregnation technique which is used to fill the shell pores with a saturated solution of the metal catalyst in salt form. The pellets are contacted with sufficient solution only to the extent necessary to saturate the porous shell. The pellets are then dried to remove the water and to deposit the metal catalyst within the pores. This impregnation process may be repeated until the desired level of impregnation is achieved. The pellets are next heated to a temperature ranging from about 300°–700° C., with a temperature of about 500° C. being preferred, in order to decompose the metal salt, thereby converting it to the oxide form. The catalyst is subsequently activated by an appropriate treatment. In the case of a nickel catalyst, the pellets are treated with hydrogen at about 300–500° C. to reduce the nickel oxide to its elemental metal form.

In a second method, prior to the impregnation method described above, the pellets are treated with carbon dioxide gas at 500–800° C. to convert the CaO cores to $CaCO_3$ cores. The pellets are then cooled to ambient temperature and the pore volume impregnation technique is used to fill the shell pores with an aqueous solution of metal salt. The pellets are subsequently dried to remove the water and to deposit the metal salt with the pores of the pellet. Again, multiple impregnations may be used to achieve the requisite amount of loading of the metal catalyst. The pellets are then heated to decompose the metal salt and thereafter treated to activate the catalyst in the manner outlined above.

The hydrogen production process of this invention can employ either of the two types of primary chemical reactions, shown below:

$$CH_{4(g)} + 2H_2O_{(g)} = CO_{2(g)} + 4H_{2(g)} \quad (1)$$

$$CO_{(g)} + H_2O_{(g)} = CO_{2(g)} + H_{2(g)} \quad (2)$$

Reaction (1) illustrates the reaction of methane with steam to produce carbon dioxide and hydrogen, and preferably employs a Ni catalyst. Reaction (2) illustrates the reaction of CO with steam to produce $CO_2$ and $H_2$ which is known as the water gas shift reaction. This reaction preferably uses an iron oxide catalyst. The sorbent of the invention removes carbon dioxide ($CO_2$) from the hot gas stream by means of the following reaction (using CaO as an example):

$$CaO_{(s)} + CO_{2(g)} = CaCO_{3(s)} \quad (3)$$

The combination of an absorbent core and a catalytic shell offers at least two important advantages over prior art processes. First, the presence of a strong absorbent for the carbon dioxide helps to drive either reaction (1) or (2) which can be limited by thermodynamic equilibrium. Second, the heat absorbed by the highly endothermic reaction (1) is largely offset by the heat generated by reactions (2) and (3). Therefore, there is little need to either add or remove heat from the reaction as a whole, which greatly simplifies the design of the reaction system and improves the overall efficiency and economics of the process.

The following examples are offered to illustrate but not limit the invention. Thus, they are presented with the understanding that various formulation modifications as well as method of delivery modifications may be made and still be within the spirit of the invention.

EXAMPLE 1

Pore Volume Impregnation Technique Using Nickel

An alcohol solution of nickel salt is prepared by dissolving either nickel acetate, $Ni(C_2H_3O_2)_2 \cdot 4H_2O$, or nickel nitrate, $Ni(NO_3)_2 \cdot 6H_2$), in 95% ethanol (5% water) to form a saturated solution of the salt. Core-in-shell pellets are contacted with a limited quantity of solution, then dried to remove the solvent and to leave the salt behind in the pores. The process of impregnation can be repeated several times to achieve the desired nickel loading in the pellets. The pellets are then heated to 500° C. to decompose the nickel salt and thereby convert it into nickel oxide. The pellets are subsequently treated with hydrogen at 300–500° C. to reduce the nickel oxide to nickel.

EXAMPLE 2

Pore Volume Impregnation Technique Using Nickel and CaO Pellet Cores With Carbon Dioxide Pretreatment Prior to impregnating the core-in-shell pellets with catalyst, the pellets are treated with carbon dioxide gas at 500 to 800° C. to convert the CaO cores to $CaCO_3$ cores. The pellets are cooled to ambient temperature and the pore volume impregnation technique described in Example 1 is used to fill the shell pores with an aqueous solution of a nickel salt. A solution containing 10–30 wt. % $Ni(NO_3)_2$ is suitable for this purpose. The pellets are subsequently dried to remove the water and to deposit the nickel salt within the pore. Multiple impregnations can be used to achieve the desired nickel loading. The pellets are then heated to 500° C. to decompose the nickel salt and further heated to 900° C. to convert $CaCO_3$ in the core material to CaO. The pellets are subsequently treated with hydrogen at 300–500° C. to reduce the nickel oxide to nickel.

It should be appreciated that the compositions and methods of this invention may be extended to other chemical reaction systems which require a solid catalyst and where it is advantageous to separate the produces of reaction by selective absorption of a reaction product. Also, modifications of the composition and the ranges expressed herein may be made and still come within the scope and spirit of the present invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

All articles cited herein and in the following list are hereby expressly incorporated in their entirety by reference.

CITATIONS

Akiti, Jr., T. T., et al. A regenerabe calcium-based core-in-shell sorbent for desulfurizing hot coat gas. *Ind. Eng. Chem. Res.* 2002, 41, 587–597.

Balasubramanian, B. et al. Hydrogen from methane in a single-step process. *Chem. Eng. Sci.* 1999, 54, 3543–3552.

Ding, Y. et al. Adsorption-enhanced steam-methane reforming. *Chem. Eng. Sci.* 2000, 55, 3929–3940.

Hufton, J. R. et al. Sorption-enhanced reaction process for hydrogen production. *AIChE J.*, 1999, 45, 248–256.

What is claimed is:

1. A composition for promoting industrial gas-phase chemical reactions which produce $H_2$ and $CO_2$ while simultaneously separating the $H_2$ from the $CO_2$ comprising: an interior core comprising a calcium-based compound;
   a porous protective shell encasing the core, whereby the shell allows diffusion of $CO_2$ to the core; and a catalyst contained in the shell.

2. The composition of claim 1 whereby the catalyst promotes the conversion of feed gas to $H_2$.

3. The composition of claim 2 wherein the catalyst is selected from the group consisting of a steam reforming catalyst and a catalyst for the water gas shift reaction.

4. The composition of claim 1 wherein the core is regenerable.

5. The composition of claim 1 wherein the core comprises CaO.

6. The composition of claim 1 wherein the shell comprises one or more materials selected from the group consisting of hydraulic cement, refractory cement, calcium aluminate cement, calcium aluminate, alumina, clay, and fly ash.

7. The composition of claim 1 wherein the catalyst is at least one member selected from a group consisting of metals and/or oxides of tungsten, cobalt, molybdenum, vanadium, potassium, lanthanum, iron, platinum, palladium, ruthenium, zinc, chromium, copper, and nickel.

8. A composition for promoting industrial gas-phase chemical reactions which produce $H_2$ and $CO_2$ while simultaneously separating the $H_2$ from the $CO_2$ comprising: an interior core comprising a material that reacts with or absorbs $CO_2$; a porous protective shell encasing the core, said shell including a separate pore-forming material, whereby the shell allows diffusion of $CO_2$ to the core; and a catalyst contained in the shell.

9. A composition for promoting industrial gas-phase chemical reactions which produce $H_2$ and $CO_2$ while simultaneously separating the $H_2$ from the $CO_2$ comprising: an interior core consisting essentially of a material that reacts with or absorbs $CO_2$; a porous protective shell encasing the core, whereby the shell allows diffusion of $CO_2$ to the core, said shell consisting essentially of one or more materials selected from the group consisting of hydraulic cement, refractory cement, aluminate cement, alumina, clay, a separate pore-forming material, and fly ash; and a catalyst contained in the shell.

10. The composition of claim 9 wherein the core comprises one or more materials selected from the group consisting of calcium oxide, magnesium oxide, strontium oxide, and barium oxide.

* * * * *

UNITED STATES PATENT AND TRADEMARK OFFICE
CERTIFICATE OF CORRECTION

PATENT NO. : 7,176,159 B1
APPLICATION NO. : 10/218803
DATED : February 13, 2007
INVENTOR(S) : Wheelock et al.

Page 1 of 1

It is certified that error appears in the above-identified patent and that said Letters Patent is hereby corrected as shown below:

Col. 8, Claim 9, line 26:
ADD: after "refractory cement", --calcium--

Signed and Sealed this

Third Day of April, 2007

JON W. DUDAS
*Director of the United States Patent and Trademark Office*